United States Patent [19]

Ellis

[11] Patent Number: 5,410,881
[45] Date of Patent: May 2, 1995

[54] UNIVERSAL ONE MAN BRAKE BLEEDING APPARATUS

[76] Inventor: Martin J. Ellis, 517 Westwood Ave., Brunswick, Ohio 44212

[21] Appl. No.: 185,267

[22] Filed: Jan. 24, 1994

[51] Int. Cl.[6] .......................... B60T 11/30; F15B 7/10
[52] U.S. Cl. ........................... 60/584; 188/352
[58] Field of Search ................. 60/584, 572, 585; 188/352

[56] References Cited

U.S. PATENT DOCUMENTS

| | | | |
|---|---|---|---|
| 1,985,812 | 12/1934 | Banas | 60/584 |
| 2,064,573 | 12/1936 | Tatter | 188/352 X |
| 2,069,606 | 2/1937 | Gary et al. | 60/584 X |
| 2,092,251 | 9/1937 | Heidloff | 188/352 X |
| 2,502,050 | 3/1950 | Kattner | 60/584 |
| 2,633,002 | 3/1953 | Radus | 188/352 X |
| 3,039,501 | 6/1962 | Wood | 188/352 X |
| 3,183,673 | 5/1965 | Schwarz | 60/584 |
| 3,455,349 | 7/1969 | Greenwood et al. | 188/352 X |
| 3,548,978 | 12/1970 | Dyke | 188/352 |
| 3,559,405 | 2/1971 | Neilson | 60/584 X |
| 4,170,280 | 10/1979 | Schwarz | 60/584 X |

FOREIGN PATENT DOCUMENTS

| | | | |
|---|---|---|---|
| 896769 | 11/1953 | Germany | 188/352 |
| 0099852 | 8/1981 | Japan | 188/352 |

*Primary Examiner*—John E. Ryznic
*Attorney, Agent, or Firm*—Joseph H. Taddeo

[57] ABSTRACT

A vacuum activated brake reservoir refilling apparatus and a vacuum activated brake fluid recovery apparatus. The invention utilizes vacuum created during the normal brake bleeding procedure and includes a holding container filled containing fresh brake fluid and an adjustable fluid distribution attachment which is clamped to a vehicle reservoir. An unobstructed path connects the bleeder valve to be bled and a fluid collection container. Both containers utilize check valves. The holding container can only valve air into its chamber, and the collection container can only valve air out of its chamber during the brake bleeding process.

10 Claims, 4 Drawing Sheets

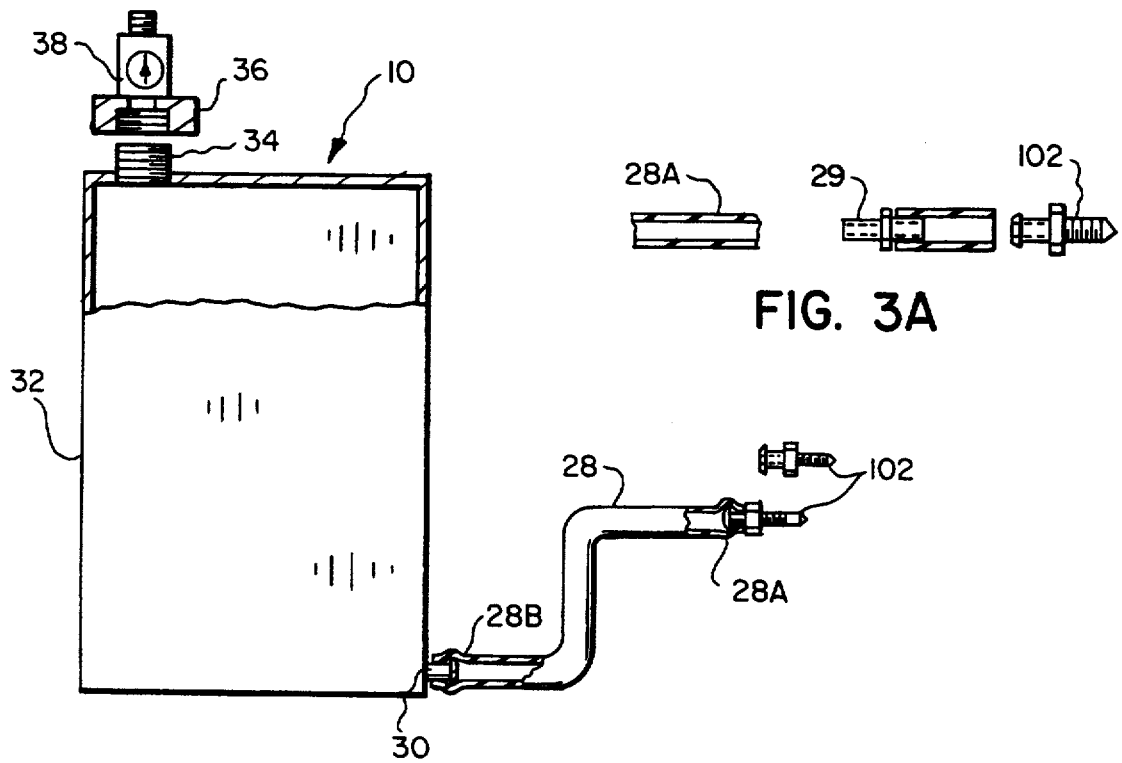
FIG. 3A
FIG. 3
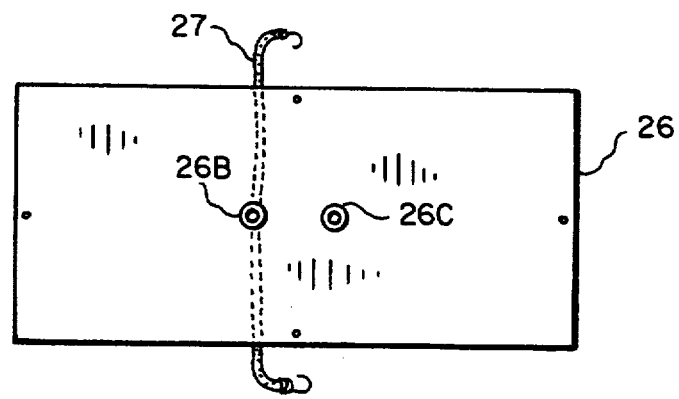
FIG. 2

UNIVERSAL ONE MAN BRAKE BLEEDING APPARATUS

FIELD OF THE INVENTION

This invention is a device to expedite bleeding brake fluid from automotive brake systems and replacement of new brake fluid in those systems. More particularly, the device of the invention enables one-man purging of such systems for removal of air or other contaminants in a brake bleeding process.

BACKGROUND OF THE INVENTION

Bleeding automotive brake systems of air and other contaminants is an important process in vehicle maintenance.

Air can enter a brake system in many ways, such as: (1) when a leak occurs and allows air to be vacuumed into the system through the point of leakage; (2) when the fluid level of the reservoir decreases to a point that allows air to be directly injected into the system; (3) when parts are replaced or repairs are made to a hydraulic brake system; or (4) when improper brake bleeding techniques are utilized.

When air is present in a brake system the air compresses when pressure is applied. This lowers the hydraulic pressure available to the caliper pistons, thus lowering the overall braking power. The brake pedal seems "mushy" or "spongy" to the user.

It is not uncommon for individuals to tolerate "spongy brakes" because the bleeding of a brake line is a somewhat detailed, painstaking process.

The brake bleeding process most commonly requires the cooperation of two people. This can be costly to a business in terms of man hours spent per patron; and the two person requirement may be awkward to a home mechanic who customarily works alone.

One person must sit inside the vehicle and operate the brake pedal, and a second person is needed to operate the valve fitting located on the brake caliper units, one wheel at a time. The two individuals must cooperate and work in unison with one another. A brief order of activities would be: Open the valve; pump the brake pedal; close the valve and release the pedal; then repeat the process until all air and contaminants are removed from the brake system. In the prior art brake bleeding systems, one person working alone could not achieve this.

Prior art patents which deal with these problems are U.S. Pat. Nos. 4,170,280, 4,201,056, 3,183,673, 2,670,874 and 2,872,951. Many others were found fitting the descriptions of "permanently mounted", "temporarily mounted" and "Duck Bill" check valves.

Prior art brake bleeders require a source of air pressure to pressurize the brake fluid holding container, whereas the device of this invention operates on a vacuum created by the motion (push and then release) of the brake pedal.

Brake bleeding in all of the above-mentioned patents requires inspecting the fluid immediately past the fluid check valve, since view of the fluid is prevented between the check valve and bleeder in those other systems. Meanwhile, entry of air into the brake system due to a defective check valve or other defects, cannot be monitored because tubing inspection is inhibited by the check valve itself. Thus, a need exists for a brake bleeder device adapted for operation by one person or operator which allows for direct inspection of the fluid as it exits the brake system bleeder valve.

SUMMARY OF THE INVENTION

The principal objective of my invention is to reduce complexities in bleeding automotive brake systems, such as keeping the master cylinder reservoir filled with hydraulic brake fluid, enable inspection of the fluid immediately outside the bleeder valve orifice, and provide an indicator in the event the checking means becomes inoperative.

Other objectives are reduction in the number of people necessary to bleed hydraulic brake systems; simplification of the brake bleeding process by using this improved brake bleeding device; reduction of manufacturing costs.

The present invention comprises a device for emptying brake fluid to escape the vehicle's brake system under controlled conditions, while the additional fluid necessary in maintaining the vehicle's brake system is continuously and automatically added. The device includes a holding container for fresh brake fluid; a fluid distribution device which sealingly clamps onto the brake fluid reservoir; a first transparent tubing section which sealingly interconnects the holding container and the fluid distribution device; a fluid collection container; a second transparent tubing section sealingly interconnecting the collection container and the bleeder valve; and, a means for lowering pressure in the collection container to prevent used brake fluid, air and gases which have exited the bleeder valve from reentering that valve. The device allows the fluid to be inspected for contamination from the point of expulsion from the bleeder valve to the fluid collection container with no obstruction to fluid flow.

BRIEF DESCRIPTION OF THE DRAWINGS

FIG. 2 is a top plan view of the fluid distribution device with fluid distribution ports and an elastic cord for attachment of the distribution device to the brake fluid reservoir.

FIG. 3 is a side elevation view of the fluid collection container, a second section of flexible, transparent tubing, and the fluid collection container cap.

FIG. 3A is a side elevation of adapters for interconnecting a tubing section to bleeder valves of different sizes.

DESCRIPTION OF THE PREFERRED EMBODIMENT

Figure 1:
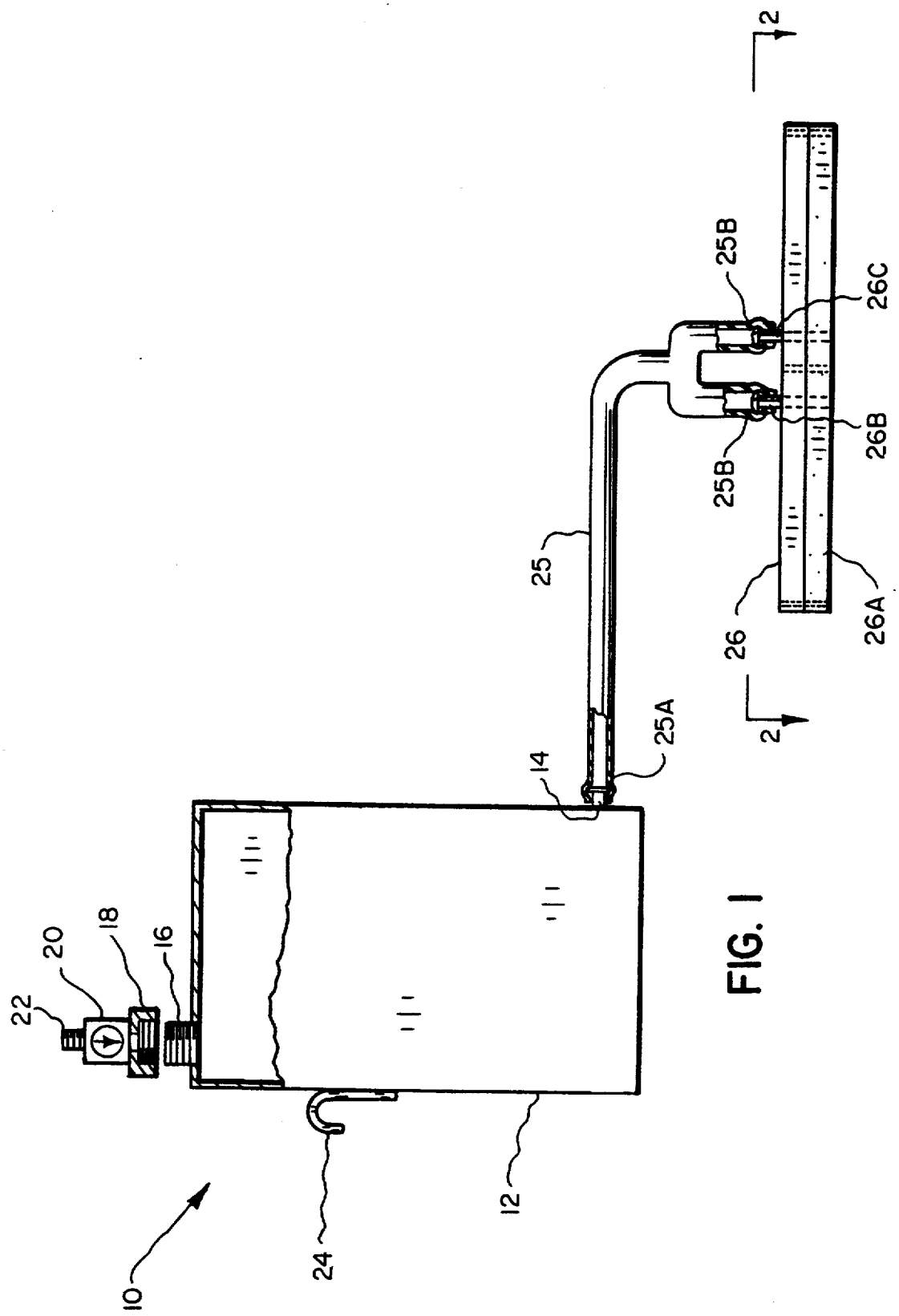
FIG. 1 is a side elevation view of the first portion of the brake bleeding device in accordance with this invention.
Figure 4:
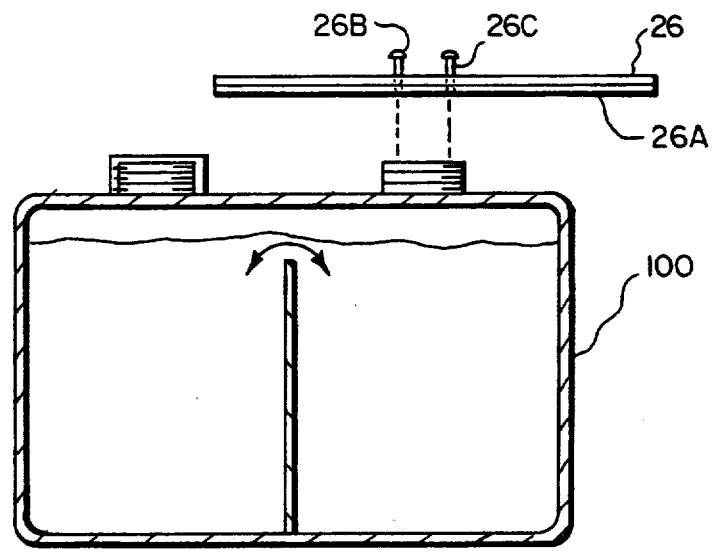
FIG. 4 is a side plan view of the fluid distribution device adapted for fitting to one type of a brake fluid reservoir.
Figure 5:
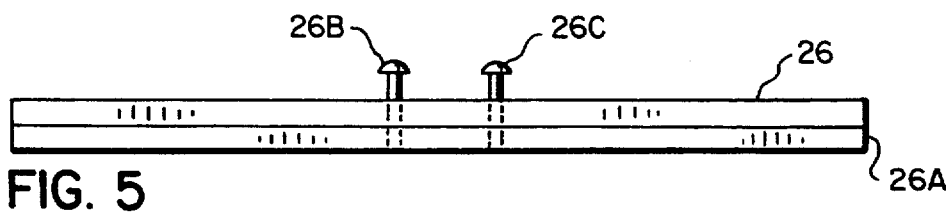
FIG. 5 is a side elevation view of the fluid distribution device.
Figure 5A:
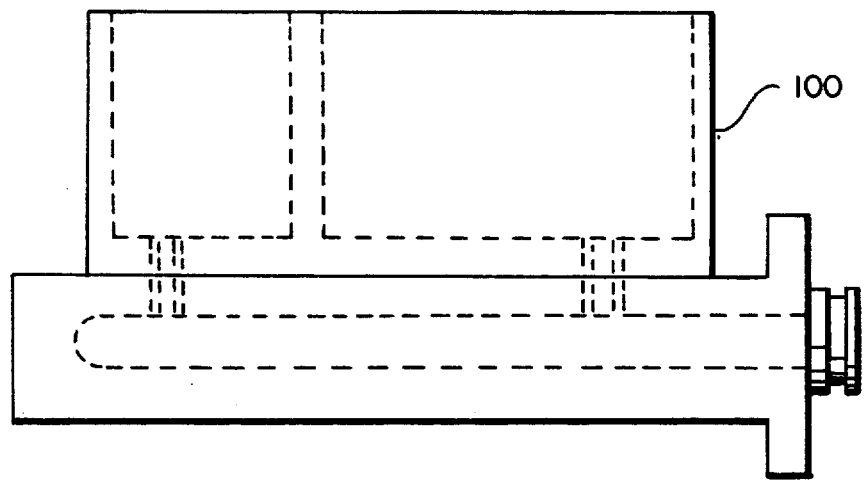
FIG. 5A is a fluid distribution device adapted for fitting to an alternative type of brake fluid reservoir.

Standard brake systems contain a hydraulic fluid within the wheel brake system which fluid is retained in the brake lines by means of a brake bleeder valve which can be opened and closed. When the valve is opened, fluid, gases and contaminants within the system can be forced out of the fluid line by pressure on the brake pedal. Upon removal of pressure on the brake pedal, the used brake fluid could be drawn back into the brake system unless the bleeder valve is closed prior to removal of pressure on the pedal. As shown in the drawings FIGS. 1-6, in the device of my invention 10, there are two major functional components or portions.

The first portion comprises a fluid holding container 12, preferably constructed of a somewhat rigid translucent material, which includes an outflow or output port 14 located near the lower portion of the container 12 and a fluid filling port 16 located at or near the top of container 12. An air-tight, removable cap 18 includes a one-way airflow check valve 20 and is adapted to fit the filling port 16. The one-way check valve 20, which is preferably a flapper valve, allows air to be drawn into the fluid holding container 12 through equalizing vent 22 to equalize pressure therein when a vacuum is created within container 12. Neither air nor fluid can escape the holding container 12 through check valve 20.

A hanger means 24 adapts the holding container 12 for storage and/or positioning in the vicinity of the motor vehicle brake fluid reservoir 100. This effectively maintains the holding container 12 in a generally upright position at the same general level as the reservoir. The outflow or output port 14 extends outwardly from the holding container.

A flexible length of tubing 25 is provided with first end 25A dimensioned for attachment to output port 14. The first end 25A of the transparent tubing section 25 sealingly connects to the output port 14, thereby effectively preventing the entry of air into and escape of fluid from the holding container 12. Tubing section 25 includes a plurality of second end portions 25B which extend from the tubing 25, which end portions are dimensioned to interfit over corresponding ends of distribution ports 26B, 26C, for sealingly connecting the tubing section 25 to the fluid distributing device 26 which sealingly fits over the brake fluid reservoir of the vehicle.

Both the front and rear brake systems of a vehicle, can be serviced by utilizing the distribution ports, thereby obviating the necessity of relocating and/or readjusting the fluid distributing device 26 in the bleeder process.

Reference to FIG. 1 indicates a layer of soft, flexible non-porous material 26A, having apertures therethrough which correspond with the distribution ports 26B, 26C, forms the bottom of the distributing device 26. This layer of material 26A, allows the fluid distributing device to seal over the top of variously sized master cylinder brake fluid reservoirs 100, which reservoirs are normally sealed by a repositionable cap or top.

In FIG. 2, the fluid distributing device 26 is held in position over the master cylinder reservoir 100 by an expandable clamp 27. The clamp 27 may be formed of any elasticized material adapted to stretch and to fit around a vehicle's brake fluid reservoir 100. This elasticized clamp 27 is detachably connected to each end or each of the sides of fluid distributing device 26.

As shown in FIG. 3, the second portion of the device of my invention is adapted for fluid collection and is comprised of the following: a second section of flexible, transparent tubing 28, having a first end 28A and a second end 28B, the first end of which sealingly interfits on the bleeder valve fitting 102. An appropriately sized adapter 29 may be used to facilitate sealingly interfitting the second section of tubing 28 to the bleeder valve 102. The semisoft, flexible tubing section 28 is designed and adapted for attachment to brake bleeder valves 102. Many bleeder valves have different forms and sizes. Therefore, multiple, adapters of various sizes may be required, such as that numbered 29 in FIG. 3A.

Meanwhile, the second end 28B of tubing section 28 is adapted to sealingly interfit with an inlet port 30 located near the lower portion of a collection container 32. The fluid collection container 32 is preferably formed of a somewhat rigid translucent material to monitor fluid level. A fluid emptying port 34 is positioned near the upper portion of the collection container 32. An air tight removable cap 36 fits over the fluid collection container emptying port 34, and the cap includes a flow checking valve 38. The cap 36 is removable from the opening or port 34 of the fluid collection container for emptying fluid from the container 32.

Check valve 38 of the fluid collection container 30 allows air to escape the collection container through that check valve but effectively prevents entry of air in the reverse direction, that is, prevents the entrance of air into the collection container in order to create a vacuum condition in the brake bleeding device when the brake pedal is pushed down. The vacuum prevents fluid which is expelled from the bleeder valve from being pulled back into the brake system.

Figure 6:
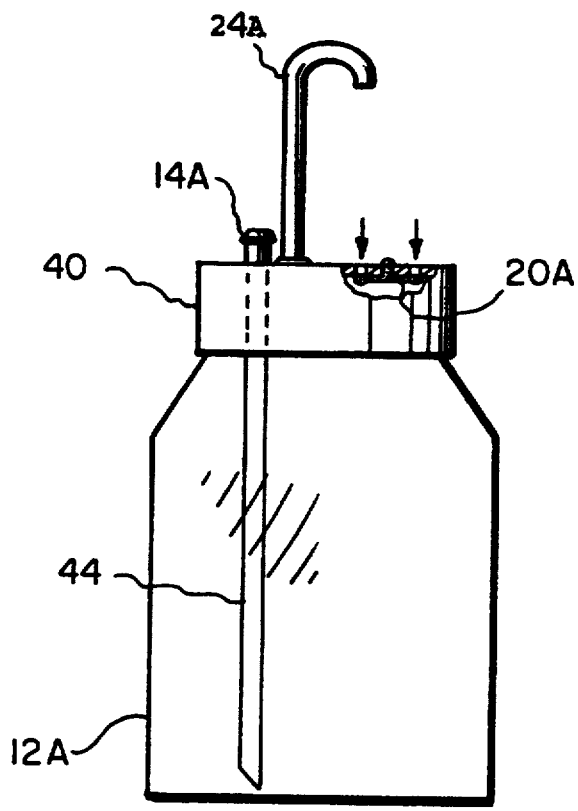
FIG. 6 is a side elevation of an alternative embodiment of the fluid holding container and cap which are designed for use first as a brake fluid stock bottle and second as the fluid holding container.
Figure 7:
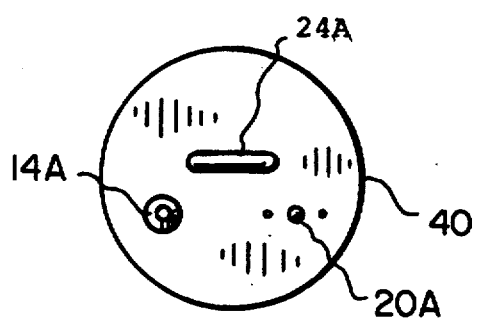
FIG. 7 is a top elevation view of the cap for a brake fluid stock bottle which also serves as a cap for the holding container in the brake bleeding process.

In another embodiment of the holding container, as shown in FIG. 6, a stock bottle 12A for brake fluid having a standard cap (not shown) with cap 40 sold in conjunction with the bottle, can serve as the holding container. Alternatively, the stock bottle 12A can be sold with cap 40 installed as shown in FIG. 6, ready for use as the holding container. See, also, FIG. 7, which indicates that cap 40 includes output port 14A, stem 44, hanger 24A, and check valve 20A.

When in use, the simplicity of the invention and reduced complexity of the brake bleeding process allow one person to perform the brake bleeding process.

First, the brake fluid reservoir 100 is opened and the reservoir is filled to sufficient capacity as required for normal use. The fluid holding container 12 is then placed in the vicinity of the brake reservoir 100, by hanger means 24.

The fluid distribution device 26 is then placed over the reservoir 100 opening or openings to create an airtight seal between the fluid distribution device 26 and the brake fluid reservoir 100. The apparatus is placed so that each reservoir opening being sealed has at least one distribution port 26B connected by tubing 25 to the fluid holding container 12. In the alternative, each distribution port must be used in one or both reservoir openings. Continuous pressure is applied between the two parts, distribution device 26, and the brake fluid reservoir 100, using the expandable clamp 27. The connection between an open end of the tubing 28A, and the bleeder valve fitting 102 of the brake caliper unit (not shown) is accomplished by inserting the tubing end 28A over the bleeder valve fitting 102. The bleeder valve 102 is then opened to allow fluid to be forced out of the bleeder valve 102 under pressure.

The vehicle brake pedal (not shown) is then activated through its full range. The bled fluid will travel through the tubing section 28 and collect in the fluid collection container 32 through inlet port 30 positioned near the lower portion thereof. The fluid collecting container 32 must be of sufficient strength and durability for creating or sustaining the vacuum in the system.

The vehicle brake pedal is pressed down and held in this position until the braking pressure felt through the pedal subsides. The brake pedal may then be released. Upon release of the brake pedal, a vacuum is created in the brake reservoir 100 which pulls brake fluid from the fluid container 32 through tubing 25 and through the applicable fluid distribution ports 26B, 26C. Concurrently, a vacuum is likewise created in the fluid collection container 32, which prevents expelled fluid from being drawn back through the bleeder valve into the brake system.

When this bleeding procedure is concluded, the bleeder valve fitting 102 is closed, and the first end 28A of tube 28 is disconnected from the bleeder valve 102. The procedure is repeated for all bleeder valves of the hydraulic brake system. Upon conclusion of the brake bleeding process, the fluid distribution device 26 is disconnected from the vehicle brake fluid reservoir 100 by removing elasticized attachment or clamp 27 and the original reservoir cap is reinstalled being sure the reservoir fluid level is adequate for normal use.

Tubing sections 25 and 28 are preferably constructed of a flexible, transparent material. All materials of which this brake bleeder device is constructed are non-reactive to hydraulic brake fluid. An example of such material is high density polyethylene (HDPE). Other materials such as brass or aluminum would be suitable for use in other brake systems, which use a different hydraulic fluid, while such systems may be bled in much the same manner. The physical connections between the individual pieces described need not be permanent, but adapted for attachment to create only a snug fitting seal when connected. The device can be used or readily adapted for use on any vehicle having a hydraulic brake system.

I claim:

1. A portable brake bleeder apparatus, for changing brake fluid in brake systems of vehicles using a hydraulic brake activated by pressure on and release of the brake pedal, brake fluid and having a brake fluid reservoir, brake lines and bleeder valves, the apparatus comprising:
   a holding container for the fresh brake fluid;
   an adjustable fluid distribution device adapted to sealingly clamp to the brake fluid reservoir;
   a first tubing section sealingly interconnecting said holding container and the fluid distribution device;
   a fluid collection container;
   a second tubing section sealingly interconnecting the collection container and one of said bleeder valves;
   a means for maintaining lowered pressure in the collection container, said lowered pressured created by pressure on the vehicle brake pedal, to draw new brake fluid from the holding container into the brake system, to force used brake fluid and contaminants out of the bleeder valve, and to prevent backflow of used brake fluid into the bleeder valve;
   said distributing device having a plurality of distribution ports adapted for sealing attachment to variously sized master cylinder brake reservoirs for fluid flow from said distribution device into said reservoir;
   wherein said means for maintaining lowered pressure comprises a one-way check valve associated with the holding container for input of air only to said holding container and a one-way check valve in said collection container for output of air only from said collection container, such that as brake pressure forces air from, and lowers pressure in, the collection container, backflow of used brake fluid from the collection container into the bleeder valve is prevented.

2. A portable brake bleeder apparatus as described in claim 1, wherein said holding container is formed as a stock bottle for brake fluid.

3. The portable brake bleeder apparatus of claim 2, further comprising a bottle cap having a one-way airflow check valve, a hanger means and an output port.

4. A portable brake bleeder apparatus for use bleeding brake fluid from brake systems of vehicles using a hydraulic brake, brake fluid and having a brake fluid reservoir, brake lines and a brake bleeder valve at the end of each brake line, comprising:
   a brake fluid holding container having a top and bottom with a first opening in the top and a second opening near the bottom;
   a removable cap displaced in the first opening in said holding container top, said cap having a one-way check valve in said opening said valve adapted for allowing air into, but not out of, the fluid holding container;
   an output port in a lower portion of said container with a cylindrical projection extending from said port;
   a fluid distribution device sealingly interfitted with a master cylinder brake reservoir;
   a first section of tubing having first and second ends, the first end sealingly connected to said cylindrical projection of the holding container; and the second end of said first tubing section sealingly connected to the fluid distribution device;
   a fluid collection portion comprising a fluid collection container having inlet and outlet ports;
   a second tubing section having first and second ends, a first end thereof sealingly interfitting a brake bleeder valve; said second end sealingly interfitted with the inlet port of the fluid collection container; and,
   said fluid collection container further having in the outlet port, a one-way check valve for expelling air from the container to the outside atmosphere for creation of a vacuum in the bleeder apparatus upon release of a depressed brake pedal to prevent brake fluid flow back into the brake line after air and other contaminants have exited through the bleeder valve.

5. A portable brake bleeder apparatus as described in claim 4, wherein said first and second tubing sections are formed of transparent flexible tubing material.

6. A portable brake bleeder apparatus as described in claim 5, further comprising a plurality of variously sized adapters to interconnect the first end of said second tubing section and a brake bleeder valve and to expedite sealingly interfitting the first end of said second tubing section and brake bleeder valves of different sizes.

7. A portable brake bleeder apparatus as described in claim 6, further comprising a container hook affixed to one side of said fluid holding container for the purpose of hanging said container in a suitable location near by the brake reservoir during the brake bleeding process.

8. A portable brake bleeder apparatus as described in claim 4, wherein said holding container is formed as a stock bottle for brake fluid, said bottle having an open top.

9. A portable brake bleeder apparatus of claim 8, further comprising a bottle cap adapted to be sealing interfitted with the open top of said stock bottle, the cap having a one-way airflow check valve, a hanger means and an output port.

10. A portable brake bleeder apparatus of claim 9, wherein the fluid holding container, distribution device and fluid collection container are constructed of high density polyethylene.

* * * * *